Feb. 11, 1930.　　　　R. B. GRAY　　　　1,746,528
AUTOMATIC WINDSHIELD WIPER
Filed June 2, 1927　　　3 Sheets-Sheet 1
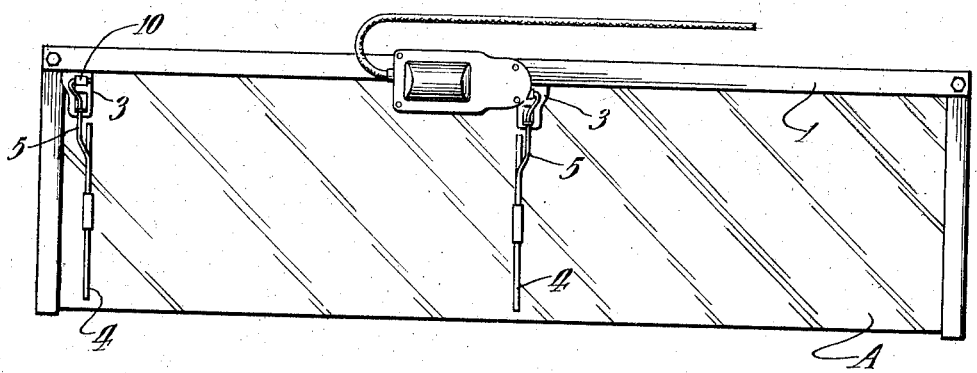
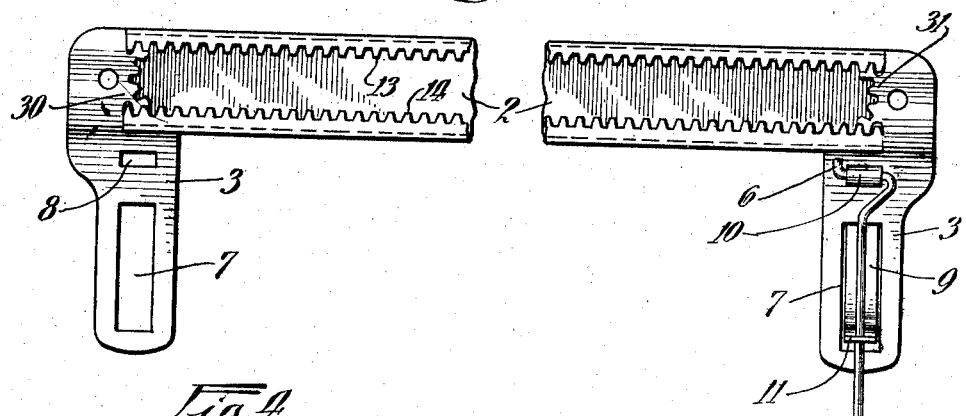
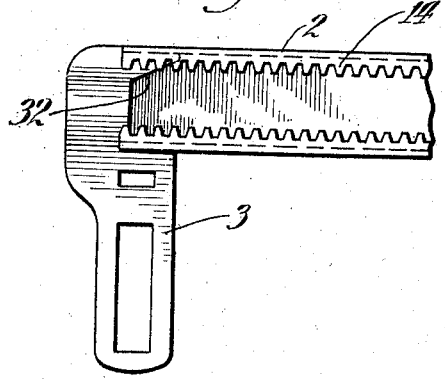
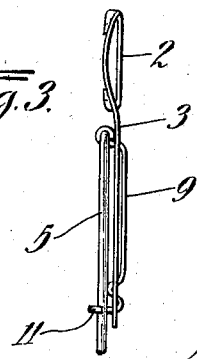
Inventor,
Ralph B. Gray,
By Wm. F. Freudenreich
Attorney.

Feb. 11, 1930.   R. B. GRAY   1,746,528
AUTOMATIC WINDSHIELD WIPER
Filed June 2, 1927   3 Sheets-Sheet 2
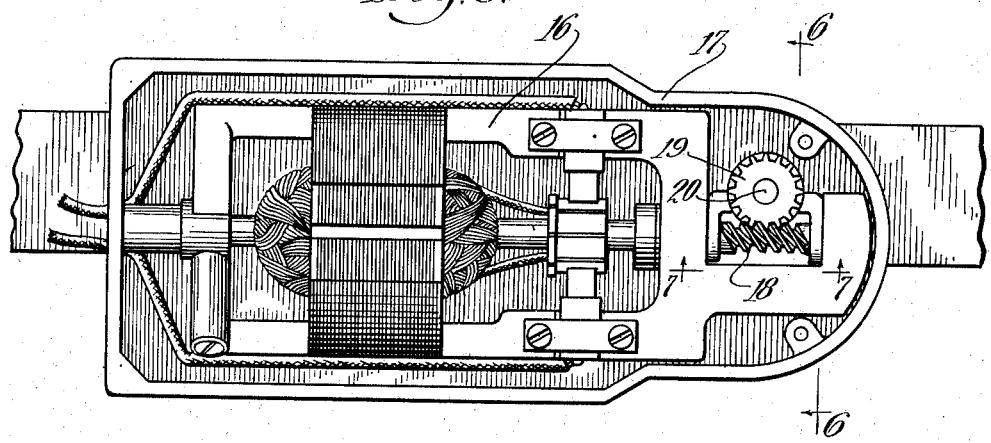
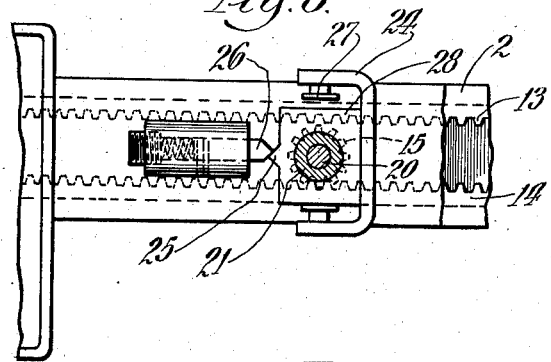
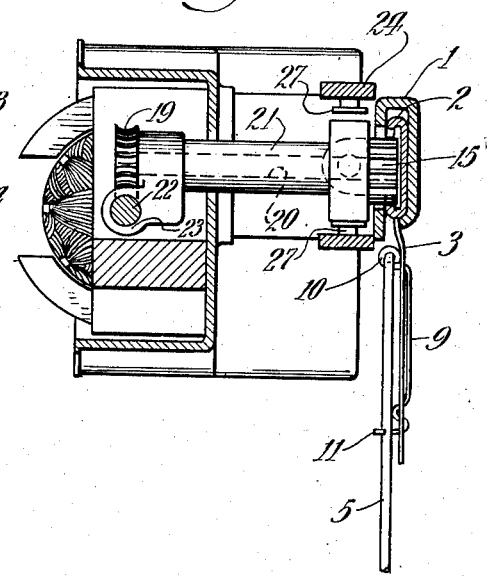
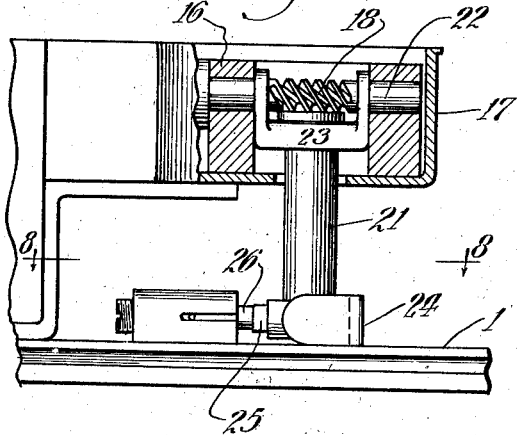
Inventor:
Ralph B. Gray.
By Wm. F. Freudenreich,
Attorney.

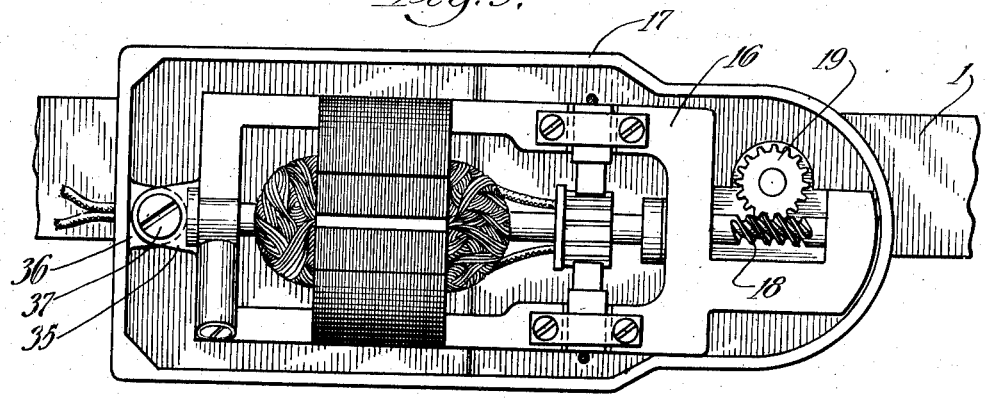
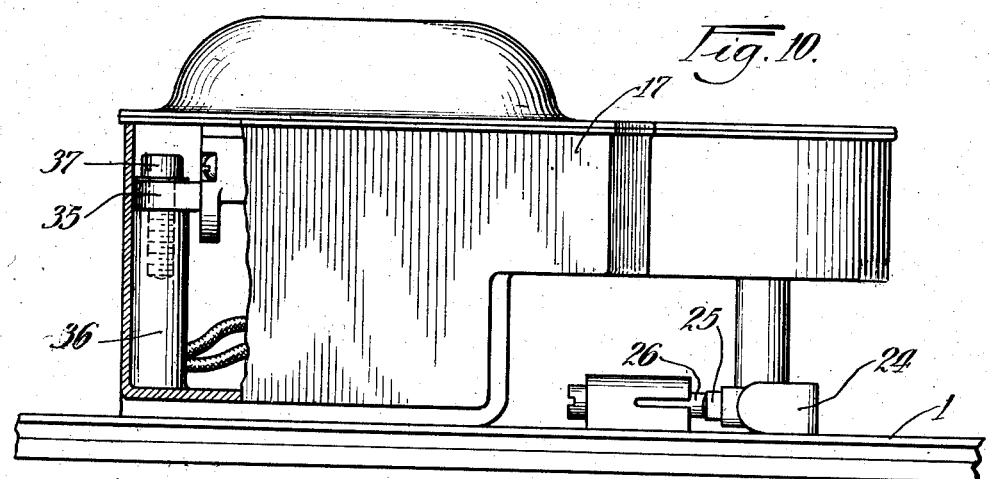
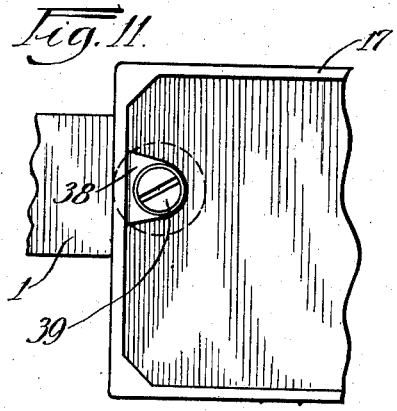
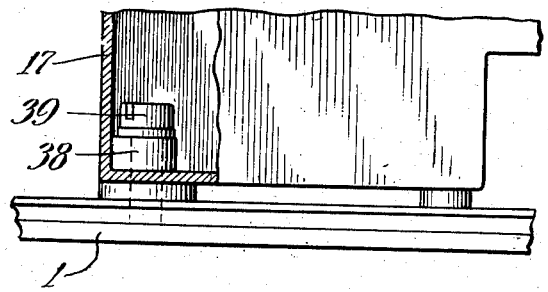

Patented Feb. 11, 1930

1,746,528

UNITED STATES PATENT OFFICE

RALPH B. GRAY, OF CHICAGO, ILLINOIS

AUTOMATIC WINDSHIELD WIPER

Application filed June 2, 1927. Serial No. 195,922.

The present invention has for its object to produce a simple and novel reciprocating windshield wiper whose direction of motion will automatically be reversed without reversing the driving motor and without requiring the wiper to travel in any other direction than simply back and forth.

A further object of the present invention is to produce a simple and novel mounting for a wiper blade, whereby the latter may be quickly and easily attached or detached and be yieldingly held in contact with the windshield when in service.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of a windshield having one of my improved devices attached thereto; Fig. 2 is a front elevation, on a larger scale than Fig. 1, of the reciprocable blade carrying member, one of the two blades or wipers being shown in position and the other being omitted; Fig. 3 is an edge view of a part shown in Fig. 2, looking at the right hand end of Fig. 2; Fig. 4 is a view similar to the left hand end of Fig. 2, showing a modification; Fig. 5 is a front view of a fragment of the device, showing the motor with its cover removed; Fig. 6 is a section taken approximately on line 6—6 of Fig. 5; Fig. 7 is a section taken approximately on line 7—7 of Fig. 5; Fig. 8 is a section taken approximately on line 8—8 of Fig. 7; Fig. 9 is a view similar to Fig. 5, showing a modification; Fig. 10 is a side view of a fragment of the device, showing a modified motor mounting, a fragment of the motor casing being broken away; Fig. 11 is a front view of a fragment of the device, the cover for the motor casing being omitted, illustrating a modification in which the motor casing is pivotally supported: and Fig. 12 is a section taken approximately on line 12—12 of Fig. 11.

Referring to the drawings, A represents a windshield of any suitable window to which a wiper is to be applied. Extending transversely across the windshield is a stationary casing 1 that may be said in a general way to have the appearance of a long, comparatively thin, narrow, flat bar whose cross section is that of an inverted U, as best shown in Fig. 6. Suitably supported within the casing 1 is a carrier 2 for the wipers or blades. This carrier is in the form of a blade whose length is about half that of the casing. At the ends of the carrier are downwardly projecting ears 3, 3 to which the stems of the blades or wipers are fastened. In the arrangement shown, each blade or wiper 4 is secured in any usual or suitable way to a stem 5. The upper end of each stem is bent laterally, as indicated at 6. Each of the ears on the carrier has in the lower portion a long slot or window 7 and at a point above the latter a small slot or window 8. Behind each ear is a flat spring 9 having its upper end bent into the form of a tube 10 that projects forwardly through the upper slot or window and serves as a hinge knuckle in which the horizontal upper end 6 of the wiper stem is journalled. The lower end of the spring 9 is bent forwardly through the bottom of the slot or window 7 and has thereon a hook 11 that is engaged with the stem. It will thus be seen that the stem can swing about its upper end as a pivot, the spring tending constantly to hold it in one angular position, however. By properly adjusting the parts, the spring may act always yieldingly to press the wiper or blade against the windshield.

When the carrier is moved back and forth in its casing, each blade or wiper travels in a straight line back and forth across the windshield, wiping one-half of the latter; so that the two blades, together, keep the entire windshield clean.

It is my purpose to reciprocate the carrier in a straight line and without movement transversely of its length, by means of a motor running always in one direction. To this end I provide the carrier with two oppositely disposed racks 13 and 14, one along the upper longitudinal edge, and the other along the bottom. The racks may conveniently be formed by making the carrier of sheet metal, cutting teeth in the long edges, and bending over marginal portions along said long edges to cause the two sets of teeth to lie in the same plane on the front side of the carrier. The carrier is driven back and forth by means of a pinion 15 that always rotates in the same direction. If the direction of the pinion were reversed at the end of each stroke of the carrier, only a single rack would be required. However, I prefer to drive the pinion from an electric motor and, in order to avoid complications, do not reverse the motor. The reversal of movement of the carrier is obtained by shifting the pinion from one rack to the other, its engagement with one of the racks driving the carrier in one direction and the other rack being employed to drive the carrier in the opposite direction. So far as the broad idea is concerned, it is sufficient that the pinion be bodily shiftable from one rack toward the other, although the detailed means for accomplishing this end may vary widely. Similarly, the means for shifting the pinion may take various forms.

In the arrangement shown in the first eight figures, there is a motor 16 mounted in a housing 17 fixed to the casing 1. On the motor shaft is a worm 18 meshing with a worm wheel 19 fixed to one end of a shaft 20 to the other end of which the pinion 15 is secured. The shaft 20 rotates in a bearing sleeve 21 hung from the worm shaft 22 by hangers 23 that permit the worm wheel to swing about the long axis of the worm. Therefore, when the pinion 15 and its support swing through a sufficient angle to affect the shifting of the pinion from one rack to the other, the proper driving relation between the worm and worm wheel is maintained. A suitable U-shaped stop 24 is fastened to the casing 1 in a position to bring its arms on opposite sides of and in the path of movement of the bearing sleeve 21, so as to limit the swinging movements of the sleeve and the pinion. Some means must be provided to hold the pinion in engagement with the proper rack during the period required to shift the carrier through a complete stroke. To this end, as best shown in Figs. 7 and 8, the sleeve 21 has on one side thereof a projection 25, preferably wedge-shaped, cooperating with the wedge-shaped end of a spring pressed pin 26 mounted on the casing 1 beside the sleeve. The pin holds the pinion in engagement with one rack or the other, depending upon whether its wedge-shaped end lies above or below the projection on the bearing sleeve. In Figs. 6 and 8 the pinion is shown in engagement with the lower rack, the locking pin overlying the projection on the sleeve. If the pinion is pushed upwardly, until the point of the projection has passed the point on the end of the pin 26, the pin exerts a wedging action to complete the throw of the pinion, subsequently holding the pinion in operative relation to the upper rack. The stop lug 24 is preferably provided with adjustable stop pieces 27 that engage with the sleeve or an enlargement 28 on the sleeve and take the lateral thrust produced by the spring-pressed pin, instead of causing this thrust to be transferred to the racks.

Any suitable means may be provided for shifting the pinion up or down, as the case may be, at the end of the stroke of the carrier. In the arrangement shown in Fig. 2, the carrier is provided at each end with a toothed segment, as indicated at 30 and 31, these segments extending between the upper and lower racks, although they need not lie in the same plane as the racks if the pinion is wide enough. The segments 30 and 31 are so placed that when the pinion reaches either end of the carrier, or rather either end of the carrier is brought up to the pinion, the pinion is compelled to mesh with a toothed segment. Since the toothed segments cannot move up or down, the pinion is compelled to move and is thus shifted from one rack to the other.

Instead of employing transferring toothed segments, cams or inclined faces may be placed at the ends of the carrier to engage with the pinion and press it up or down, as the case may be, as the end of a stroke is approached. Thus, in Fig. 4 there is illustrated a downwardly inclined guide surface 32 placed at the end of the upper rack. As the carrier is moved toward the right through the cooperation of the pinion with the upper rack, the inclined guide face 32 rides on top of the pinion, just before the end of the stroke, and forces the pinion down into engagement with the lower rack. A similar, but upwardly inclined guide element, (not shown), will be provided at the other end of the carrier. As soon as the pinion is forced out of engagement with the teeth of one rack, the motive power for swinging the pinion ceases, and therefore the locking pin device must be made to complete the throw of the pinion after it has been started by one of the cams or inclines; this requiring simply an ordinary snap action such as is commonly employed in electric switches and the like.

Instead of effecting the shifting movement of the pinion by simply moving its immediate support, the entire motor, or the entire motor unit, including the casing, may be moved.

In Figures 9 and 10 there is shown a construction in which the motor is pivotally attached to its housing at the end remote from the driving end. The motor frame has an ear 35 projecting therefrom, this ear resting on a post 36 on the inner side of the end wall of the housing, and there being a screw 37 extending through the ear end into the post. The screw serves as a journal or hinge pintle, whereby the entire motor may oscillate slightly to permit the driving pinion to be shifted from one rack to the other. The free end of the motor frame, and the adjacent portions of the housing may be so shaped, as shown in Fig. 9, as to limit the swinging movements of the motor; Fig. 9 showing the motor at the lower limit of its swinging movements. It will be seen that a slight upward swinging movement of the motor will cause the right hand end of the frame to strike the curved right hand wall of the housing, thereby limiting the upward swinging movement of the motor.

In Figs. 11 and 12 I have shown the entire motor unit mounted so as to swing. In this construction, the housing for the motor is provided with a lug 38 that may correspond in size and location to a small section of the post 36 at the lower end of the post in the arrangement shown in Figs. 9 and 10. A screw 39 extends through the lug 38 and into the underlying wiper casing 1; the entire motor unit being permitted to swing about the long axis of the screw.

It will be seen that in all of the forms of my invention illustrated and described, the windshield wipers will be moved back and forth in a straight line by means of a motor that runs continuously in one direction and therefore need not be reversed; the reversing of the direction of movement of the wipers being effected by simple mechanical means that is positive in its action and not likely to get out of order.

While I have illustrated and described with particularity only a single preferred general form of my invention, together with several modifications as to detail, I do not wish to be limited to the particular constructions thus illustrated and described; but intend to cover all forms and arrangements which come within the definitions of my invention constituting the appended claims.

I claim:

1. In a device of the character described, an elongated casing, a long carrier slidable in the casing, two opposed racks extending in the direction of the casing on the carrier, a motor means pivotally supported on said casing for swinging movements about an axis at right angles to the plane of the racks, said motor means including a shaft arranged parallel with the swinging axis of said motor means and extending into the space between the racks, a pinion on said shaft in position to engage with the racks, the pinion being of such a diameter as to prevent it from engaging with both racks at the same time, and means at the ends of the racks for causing said motor means to swing and shift the pinion into engagement with the opposite rack whenever the end of either rack reaches the pinion while engaged with the latter.

2. In a device of the character described, an elongated casing, a long carrier slidable in the casing and provided with two separated opposed racks extending in the direction of the length of the casing, a housing pivotally mounted on said casing so as to be capable of swinging about an axis at right angles to the plane of the racks, a motor mounted in the housing so as to swing therewith, a shaft mounted in the housing with its long axis parallel with the swinging axis of the housing, a pinion on said shaft in the space between the two racks, the pinion being of such a diameter as to prevent it from engaging with both racks at the same time, a driving connection between said shaft and the motor, and means at the ends of the rack for causing the housing to be swung pivotally to shift the pinion into engagement with the opposite rack whenever the end of either rack reaches the pinion while engaged therewith.

3. In a device of the character described, an elongated casing, a carrier mounted on the casing so as to be slidable lengthwise of the latter, said carrier comprising a strip of sheet metal having the marginal portions at its long edges bent laterally on one side and shaped to produce two opposed parallel racks, said casing having an opening therein opposite the side of the carrier on which the racks are located, a motor means mounted on the casing to swing about an axis at right angles to the plane of said racks and including a pinion extending into the casing through said opening, the pinion being smaller in diameter than the opening and of such diameter that it will engage with only one rack at a time, and means at the ends of the racks for shifting the motor means bodily to bring the pinion into engagement with the opposite rack whenever the end of either rack reaches the pinion while engaged therewith.

In testimony whereof, I sign this specification.

RALPH B. GRAY.